US012266842B2

(12) United States Patent
Zhang

(10) Patent No.: US 12,266,842 B2
(45) Date of Patent: Apr. 1, 2025

(54) POWER DIVIDER COMPRISING A MICROSTRIP AND INCLUDING AN OPEN-CIRCUITED STUB AND A SHORT-CIRCUITED STUB EXTENDING AWAY FROM THE MICROSTRIP

(71) Applicant: Suzhou Luxshare Technology Co., Ltd., Suzhou (CN)

(72) Inventor: Wanqiang Zhang, Suzhou (CN)

(73) Assignee: Suzhou Luxshare Technology Co., Ltd., Suzhou (CN)

( * ) Notice: Subject to any disclaimer, the term of this patent is extended or adjusted under 35 U.S.C. 154(b) by 238 days.

(21) Appl. No.: 18/091,011

(22) Filed: Dec. 29, 2022

(65) Prior Publication Data

US 2024/0113435 A1 Apr. 4, 2024

(30) Foreign Application Priority Data

Sep. 26, 2022 (CN) ........................ 202211178471.2

(51) Int. Cl.
*H01P 5/12* (2006.01)
*H01Q 5/25* (2015.01)
*H01Q 9/04* (2006.01)

(52) U.S. Cl.
CPC ................ *H01P 5/12* (2013.01); *H01Q 5/25* (2015.01); *H01Q 9/0421* (2013.01); *H01Q 9/045* (2013.01)

(58) Field of Classification Search
CPC ........................................................ H01P 5/12
USPC ........................................................ 333/128
See application file for complete search history.

(56) References Cited

FOREIGN PATENT DOCUMENTS

| | | | |
|---|---|---|---|
| CN | 201540942 | U | 8/2010 |
| CN | 204348876 | U | 5/2015 |
| CN | 205159484 | U | 4/2016 |
| CN | 105811065 | A | 7/2016 |
| CN | 205646083 | U | 10/2016 |
| CN | 106410348 | A | 2/2017 |
| CN | 206116581 | U | 4/2017 |

(Continued)

OTHER PUBLICATIONS

Mo, "Key Technology Research on Multi-Band Planar Multi-Way Power Divider," Master Thesis, University of Electronic Science and Technology of China, 2014, pp. 1-64 (73 pages total) with English abstract.

(Continued)

*Primary Examiner* — Benny T Lee
(74) *Attorney, Agent, or Firm* — Birch, Stewart, Kolasch & Birch, LLP

(57) ABSTRACT

A power divider includes a substrate which includes an input terminal, a microstrip, a short-circuit stub, an open-circuit stub, a first output terminal and a second output terminal. One end of the microstrip is electrically connected to the input terminal. One end of the short-circuit stub is electrically connected to the microstrip. The first output terminal is electrically connected to the other end of the microstrip and the open-circuit stub. The second output terminal is electrically connected to the other end of the microstrip. Through impedance matching of the open-circuit stub at the first output terminal, the range of the radiated electric field at the second output terminal is reduced, and the bend slope attenuation may be carried out under the wide frequency band of 700 MHz. Therefore, the radiated electric field of the antenna can still be reduced without adjusting the antenna gain in a wide frequency band.

9 Claims, 2 Drawing Sheets

(56) References Cited

FOREIGN PATENT DOCUMENTS

| | | | |
|---|---|---|---|
| CN | 107887702 | A | 4/2018 |
| CN | 111725596 | A | 9/2020 |
| CN | 112467329 | A | 3/2021 |
| CN | 213878401 | U | 8/2021 |
| JP | 2004-236085 | A | 8/2004 |
| TW | 202316724 | A | 4/2023 |
| WO | WO 2012/115245 | A1 | 8/2012 |
| WO | WO 2014/029182 | A1 | 2/2014 |
| WO | WO 2022/025664 | A1 | 2/2022 |

OTHER PUBLICATIONS

Parad et al., "Split-Tee Power Divider," IEEE Transactions on Microwave Theory and Techniques, 1965, pp. 91-95.

Ma, "Design of dual frequency power divider and LCP flexible power divider," Nanjing University of Posts and Telecommunications [Thesis], Mar. 2018, 69 pages total, with an English abstract.

POWER DIVIDER COMPRISING A MICROSTRIP AND INCLUDING AN OPEN-CIRCUITED STUB AND A SHORT-CIRCUITED STUB EXTENDING AWAY FROM THE MICROSTRIP

CROSS-REFERENCE TO RELATED APPLICATION

This application claims the priority benefit of Chinese Patent Application Serial Number 202211178471.2, filed on Sep. 26, 2022, the full disclosure of which is incorporated herein by reference.

BACKGROUND

Technical Field

The present disclosure relates to a power divider feed network, particularly to a power divider.

Related Art

With the multi-frequency, miniaturization and complication of base station antennas, the power divider feed network is used to generate horizontal beam widths in local sub-bands of the antennas of ultra-wideband base stations.

The existing power divider feed network is mainly divided into equal power divider feed network and unequal power divider feed network. The equal power divider feed network includes an input terminal, a microstrip, a short-circuit stub stripline and a plurality of output terminals. The input terminal is electrically connected to the plurality of output terminals through the microstrip. The short-circuit stub strip line is disposed close to among the plurality of output terminals and is electrically connected to the microstrip. The microstrip and the plurality of output terminals are of the same size so that the input terminal and the output terminals have the same impedance match, respectively. Therefore, the voltage standing wave ratio (VSWR) of the input terminal and the output terminals are the same.

The sizes of the microstrips of the unequal power divider feed network and the multiple output terminals are different, so that the input terminals and the multiple output terminals have different impedance match. Therefore, the voltage standing wave ratio of the input terminal and multiple output terminals are different.

However, the power divider feeds the network of the prior art can only transmit wireless signals in a narrow frequency band, and the power division ratio of the power divider at different frequencies is nonlinear attenuation. If used in an antenna array with a small number of radiating elements, the gain of the antenna would be reduced and the radiation performance of the antenna would be affected.

In view of this, it is indeed necessary to further provide a better improvement scheme in the prior art.

SUMMARY OF THE INVENTION

In view of the deficiencies in the above-mentioned prior art, the present disclosure provides a power divider, by carrying out impedance matching on one side, so as not to need to adjust the antenna gain in a wide frequency band. Therefore, it is still possible to reduce the radiated electric field of the antenna.

In one embodiment, the power divider comprises a substrate. The substrate comprises an input terminal, a microstrip, one end of which being electrically connected to the input terminal, a short-circuit stub, one end of which being electrically connected to the microstrip, an open-circuit stub, a first output terminal electrically connected to the other end of the microstrip and the open-circuit stub; and a second output terminal electrically connected to the other end of the microstrip.

In one embodiment, the short-circuit stub and the open-circuit stub are disposed adjacent to the microstrip and inside the open-circuit stub.

In one embodiment, the short-circuit stub is disposed inside the open-circuit stub and adjacent to the microstrip.

In one embodiment, the open-circuit stub is disposed between the first output terminal and the second output terminal.

In one embodiment, the open-circuit stub extends away from the microstrip from the first output terminal; the open-circuit stub bends near the first output terminal to form a first bend; the open-circuit stub extends toward the second output terminal at where the first bend is formed and bends near the second output terminal to form a second bend; the first bending and the second bending are S-shaped; the open-circuit stub extends toward the first output terminal at where the second bend is formed and bends near the first output terminal; the second bend and the third bend are S-shaped; the open-circuit stub extends toward the second output terminal at where the third bend is formed and does not exceed over the second bend.

In one embodiment, the wire width of the open-circuit stub is smaller than the wire width of the short-circuit stub.

In one embodiment, the microstrip comprises: an input segment, one end of which being electrically connected to the input terminal; a first output segment, one end of which being electrically connected to the other end of the input segment and the other end of the first output segment is electrically connected to the first output terminal; and a second output segment, one end of the second output segment being electrically connected to the other end of the input segment and the other end of the second output segment being electrically connected to the second output segment.

In one embodiment, the impedance of the open-circuit stub is 90-140 ohms.

In one embodiment, the vertical projection of the third bend on the microstrip does not exceed the vertical projection of the first bend on the microstrip.

Through the above structure, the open-circuit stub is disposed at the first output terminal, so that the electromagnetic wave signal of the second output terminal can have a wide frequency band of 700 MHz. Therefore, the power divider may have linear decay with a slope at the band of 700 to 960 MHz to achieve the purpose of reducing the radiated electric field of the antenna without adjusting the antenna gain.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
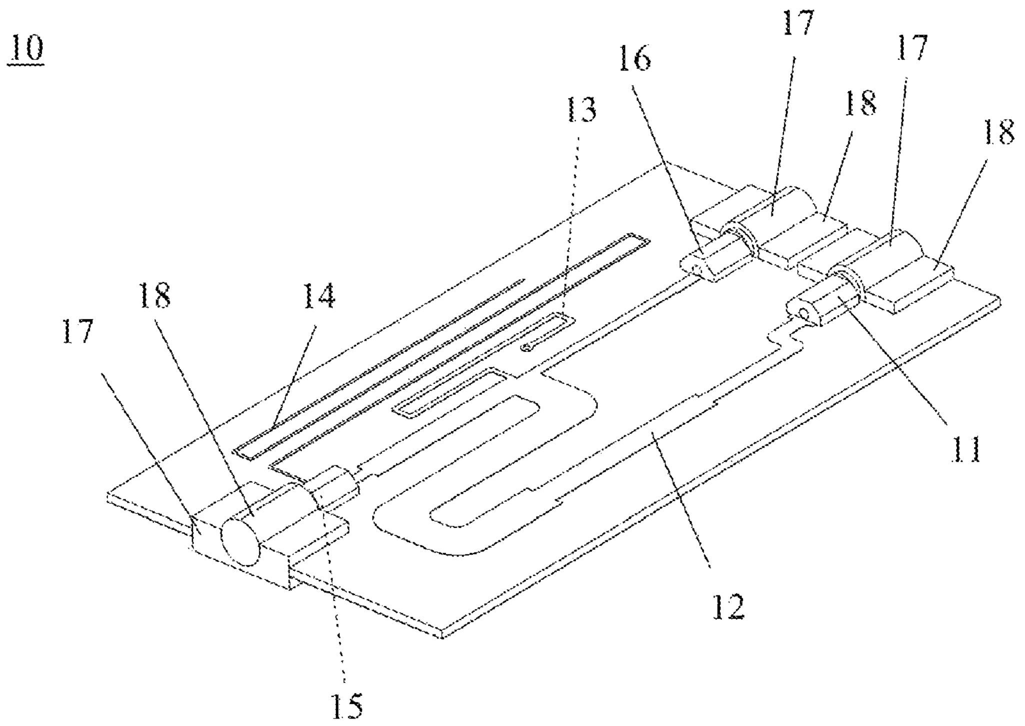
FIG. 1 is the side view of the structure diagram of the power divider of the present disclosure.

Refer to FIG. 1 for the embodiment of the power divider. As shown in FIG. 1, the power divider comprises a substrate 10. The substrate 10 has an input terminal 11, a microstrip 12, a short-circuit stub 13, an open-circuit stub 14, a first output terminal 15 and a second output terminal 16. The input terminal 11 is electrically connected to the first output terminal 15 and the second output terminal 16 respectively through the microstrip 12. The short-circuit stub 13 is electrically connected to the microstrip 12. The open-circuit stub 14 is disposed at the first output terminal 15 and is electrically connected to the first output terminal 15. In this embodiment, the substrate 10 is a printed circuit board (PCB). The microstrip 12 is a dipole antenna structure. The frequency of the transmitted electromagnetic wave signal is 617 MHz~960 MHz. The short-circuit stub 13 is electrically connected to the middle point of the signal output side of the dipole antenna. The short-circuit stub 13 is opposite to the signal input side of the dipole antenna. The short-circuit stub 13 and the open-circuit stub 14 are microstrip structures. The open-circuit stub 14 is provided at the first output terminal 15, so that the radiated electric field range of the second output terminal 16 is narrowed and can be attenuated from 700 MHz.

In details, the input terminal 11, the first output terminal 15 and the second output terminal 16 are arranged on the substrate 10. The microstrip 12 extends from the input terminal 11 toward the first output terminal 15 and the second output terminal 16, and stubs at the intermediate point between the first output terminal 15 and the second output terminal 16 to form the dipole antenna. The short-circuit stub 13 extends away from the microstrip 12 from the midpoint of the microstrip 12 and extends outward. The open-circuit stub 14 extends away from the microstrip line 12 and extend outward from the first output e terminal 15.

Figure 2:
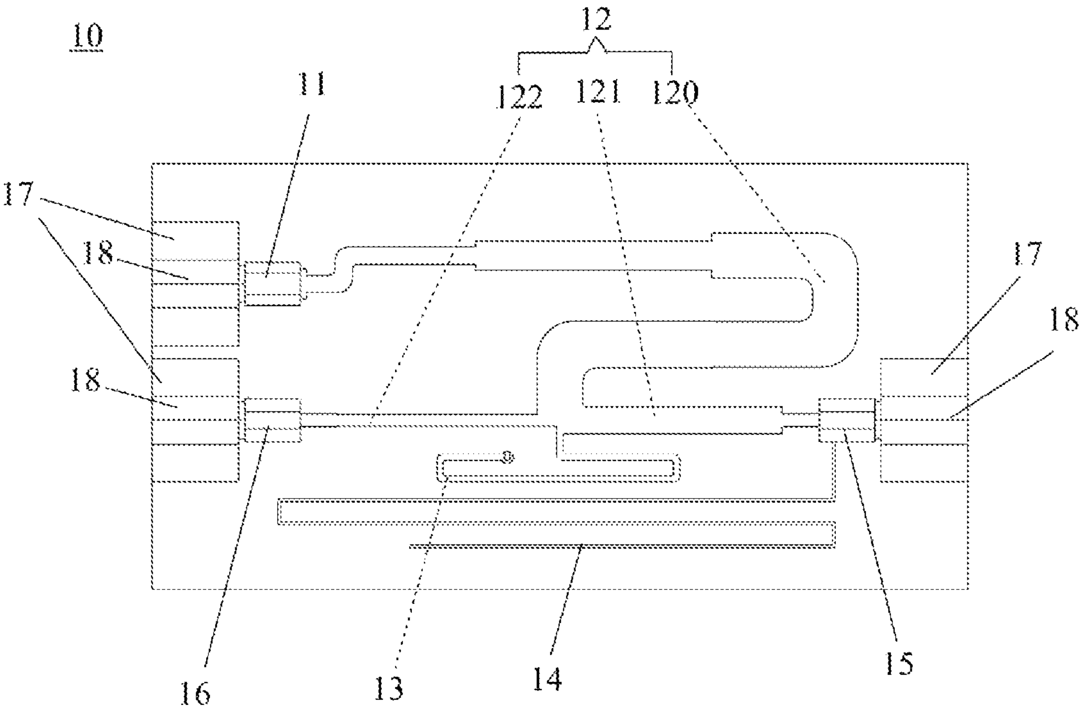
FIG. 2 is the top view of the structure diagram of the power divider of the present disclosure.

In this embodiment, as shown in FIG. 2, the microstrip 12 includes an input segment 120, a first output segment 121 and a second output segment 122. One end of the input segment 120 is electrically connected to the input terminal 11. The other end of the input segment 120 is electrically connected to one end of the first output segment 121 and one end of the second output segment 122. The other end of the first output segment 121 is electrically connected to the first output terminal 15. The other end of the second output segment 122 is electrically connected to the second output terminal 16.

In this embodiment, the wire width of the segment of the input segment 120 near the input terminal 11 gradually increases toward the first output terminal 15 and the second output terminal 16. The wire width of the first output segment 121 and the second output segment 122 is smaller than the wire diameter width of the largest segment of the input segment 120.

In this embodiment, the wire width of the first output segment 121 is greater than or equal to the wire width of the second output segment 122.

In this embodiment, the short-circuit stub 13 and the open-circuit stub 14 are arranged on the same side away from the microstrip 12.

In this embodiment, the short-circuit stub 13 is disposed adjacent to the microstrip 12 and inside the open-circuit stub 14.

In this embodiment, the short-circuit stub 13 extends toward the open-circuit stub 14 away from the microstrip 12, and is bent near the middle point to form a first short-circuit stub bend. After the short-circuit stub 13 is bent through the first short-circuit stub, the short-circuit stub 13 extends toward the first output terminal 15 and is bent near the first output end 15 to form a second short-circuit stub. The short-circuit stub 13 continues to extend toward the open-circuit stub 14, and is bent adjacent to the open-circuit stub 14 to form a third short-circuit stub bend. The short-circuit stub 13 extends toward the second output terminal 16 after being bent through the third short-circuit stub. The short-circuit stub 13 is bent near the second output terminal 16 to form a fourth short-circuit stub. The fourth short-circuit stub is bent inward (i.e., toward the second output segment 122), so that the short-circuit stub 13 is C-shaped. The C-shaped opening of the short-circuit stub 13 is adjacent to the second output segment 122. In this embodiment, the extension segment of the short-circuit stub 13 is parallel to the first output segment 121 and the second output segment 122.

In this embodiment, the open-circuit stub 14 is disposed between the first output terminal 15 and the second output terminal 16. The open-circuit stub 14 extends away from the microstrip 12 from the first output terminal 15 and is bent close to the first output terminal 15 to form a first bend. After the first bend, the open-circuit stub 14 extends toward the second output terminal 16, and bends near the second output terminal 16 to form a second bend. The first bend and the second bend are S-shaped. After the second bend, the open-circuit stub 14 extends toward the first output terminal 15 and bends near the first bend to form a third bend. The second bend and the third bend are S-shaped. After the third bend, the open-circuit stub 14 extends toward the second output terminal 16 and does not exceed the second bend. Through the first bend, the second bend and the third bend, the open-circuit stub 14 is S-shaped. In this embodiment, the extension segment of the open-circuit stub 14 is parallel to the first output segment 121 and the second output segment 122. The vertical projection of the third bend on the microstrip does not exceed the vertical projection of the first bend on the microstrip.

In this embodiment, the wire width of the short-circuit stub 13 is smaller than the wire width of the second output segment 122. The wire width of the open-circuit stub 14 is smaller than the wire width of the short-circuit stub 13.

In this embodiment, the impedance of the open-circuit stub is 90-140 ohms.

For example, the thickness of the substrate 10 is 0.762 mm, the dielectric constant is 2.98, and the wire diameter of the open-circuit stub 14 is 0.25 mm. According to the wavelength formula and the microstrip calculation formula is as follows:

$$Z_o = \frac{Z_o^a}{\sqrt{\varepsilon_e}}$$

$$Z_o^a = 59.952\ln\left(\frac{8h}{w} + \frac{w}{h}\right),\ \frac{w}{h} \le 1;$$

$$Z_o^a = \frac{119.904\pi}{\frac{w}{h} + 2.42 - 0.44\frac{h}{w} + \left(1 - \frac{h}{w}\right)^6},\ \frac{w}{h} > 1;$$

$$\varepsilon_e = \frac{\varepsilon_r + 1}{2} + \frac{\varepsilon_r - 1}{2}\left(1 + \frac{12h}{w}\right)^{-\frac{1}{2}};$$

$$\lambda = \frac{c}{f\sqrt{\varepsilon_r}}$$

In the above formula, $Z_o$ represents the characteristic impedance of the microstrip in the medium; $Z_o^a$ represents the characteristic impedance of the air microstrip; h represents the thickness of the substrate; W represents the wire width of the microstrip; w/h represents the aspect ratio of microstrip line; $\varepsilon_e$ represents the effective dielectric constant; $\varepsilon_r$ represents the dielectric constant of the substrate; the impedance $Z_o$ of the open-circuit stub 14 is obtained to be 130 ohms (Ω); λ represents a wavelength; C represents the speed of light; f represents the frequency.

In this embodiment, as shown in FIGS. 1 and 2 the substrate 10 further includes a plurality of feeding clips 17. The plurality of feeding clips 17 are C-shaped. The top surface of the C type has a top groove. The C-shaped openings of the plurality of feeding clips 17 are combined with the substrate 10 so that the top and bottom surfaces of the plurality of feeding clips 17 are respectively on the top and bottom surfaces of the substrate 10. The top groove on the top surface accommodates the feeding connectors. The feed connectors are correspondingly electrically connected to the input terminal 11, the first output terminal 15 and the second output terminal 16. Through electrical connection of the feed connector with an external power source, the power supply signal of the external power supply is input to the microstrip 12 and is output from the microstrip 12 to the first output terminal 15 and the second output terminal 16.

In this embodiment, as shown in FIGS. 1 and 2, the described power divider further comprises a plurality of feeding joints 18. The plurality of the feeding joints 18 are respectively electrically connected to the input terminal 11, the first output terminal 15 and the second output terminal 16. The plurality of the feeding joints 18 are respectively installed in the top grooves on the top surface of the feeding clip 17. The plurality of feeding joints 18 are electrically connected to external power signals.

In summary, the open-circuit stub is disposed at the first output terminal, so that the electromagnetic wave signal of the second output terminal can have a wide frequency band of 700 MHz. Therefore, the power divider may have linear decay with a slope at the band of 700 to 960 MHz to achieve the purpose of reducing the radiated electric field of the antenna without adjusting the antenna gain.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to the preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A power divider, comprising:

a substrate comprising:

an input terminal;

a microstrip, one end of the microstrip being electrically connected to the input terminal;

a short-circuit stub, one end of the short-circuit stub being electrically connected to the microstrip;

an open-circuit stub;

a first output terminal, which is electrically connected to the other end of the microstrip and the open-circuit stub; and a second output terminal electrically connected to the other end of the microstrip, wherein the short-circuit stub and the open-circuit stub are disposed at the same side and extended away from the microstrip.

2. The power divider according to claim 1, wherein the open-circuit stub has an impedance that is 90-140 ohms.

3. The power divider according to claim 1, wherein the short-circuit stub is disposed between the microstrip and the open-circuit stub.

4. The power divider according to claim 3, wherein the open-circuit stub is disposed between the first output terminal and the second output terminal.

5. The power divider according to claim 4, wherein the open-circuit stub extends away from the microstrip and extends away from the first output terminal; the open-circuit stub has a bend near the first output terminal to form a first bending; the open-circuit stub extends toward the second output terminal and has the bend near the second output terminal to form a second bending; the first bending and the second bending are S-shaped; the open-circuit stub extends toward the first output terminal and has the bend near the first output terminal to form a third bending; the second bending and the third bending are S-shaped; the open-circuit stub extends toward the second output terminal and does not extend over the second bending.

6. The power divider according to claim 5, wherein a wire width of the open-circuit stub is smaller than a wire width of the short-circuit stub.

7. The power divider according to claim 6, wherein the microstrip comprises:

an input segment, one end of the input segment being electrically connected to the input terminal;

a first output segment, one end of the first output segment being electrically connected to the other end of the input segment and the other end of the first output segment is electrically connected to the first output terminal; and a second output segment, one end of the second output segment being electrically connected to the other end of the input segment and the other end of the second output segment being electrically connected to the second output terminal.

8. The power divider according to claim 7, wherein a wire width of the first output segment is greater than or equal to a wire width of the second output segment.

9. The power divider according to claim 5, wherein the third bending is formed between the first bending and the second bending.

* * * * *